United States Patent [19]

Saceman

[11] Patent Number: 5,180,552
[45] Date of Patent: * Jan. 19, 1993

[54] ROOM AIR PURIFICATION

[75] Inventor: Don F. Saceman, Tampa, Fla.

[73] Assignee: Affiliated Innovation Management, Inc., Tampa, Fla.

[*] Notice: The portion of the term of this patent subsequent to Dec. 4, 2007 has been disclaimed.

[21] Appl. No.: 565,284

[22] Filed: Aug. 10, 1990

Related U.S. Application Data

[62] Division of Ser. No. 185,588, Apr. 22, 1980, Pat. No. 4,975,251.

[51] Int. Cl.$^5$ .............................................. A61L 9/00
[52] U.S. Cl. ............................................ 422/1; 47/66; 47/71; 422/4; 422/124; 422/169; 422/177
[58] Field of Search .................. 422/1, 4, 169, 124, 422/177; 47/58, 66, 1.4, 18, 39, 71, 84

[56] References Cited

U.S. PATENT DOCUMENTS 4,732,591 3/1988 Tujisawa et al. ................ 422/124 X
4,975,251 12/1990 Saceman ............................ 422/124

OTHER PUBLICATIONS

Houseplants Indoor Air Pollutants and Allergic Reactions, B. C. Wolverton, NASA Technology Labs., MS 39529, Dec. 1986.

Primary Examiner—Robert J. Warden
Assistant Examiner—Amalia L. Santiago
Attorney, Agent, or Firm—Charles A. McClure

[57] ABSTRACT

Treatment of room air so as to reduce its content of gaseous and particulate liquid and/or solid contaminants and then to return the air to the ambient atmosphere, with the aid of green plants in suitable apparatus. An open-top housing is divided into upper and lower portions by a foraminous plate adapted to support a potting soil layer. The housing has in its upper portion a water-retaining support for the root ball of a plant and has in its lower portion an air-pump to draw room air in via a bottom opening, to pass it upward through the potting soil and past the plant roots, through an overlying layer of charcoal or the like, out the open top and past the plant leaves, and finally back into the room. Continuous or repetitive intermittent circulation of room air in such manner through such apparatus results in prompt and effective removal of cigarette smoke and numerous other contaminants, at the same time rendering the environment more attractive to persons benefitting from such purification of the air they are necessarily breathing.

13 Claims, 1 Drawing Sheet

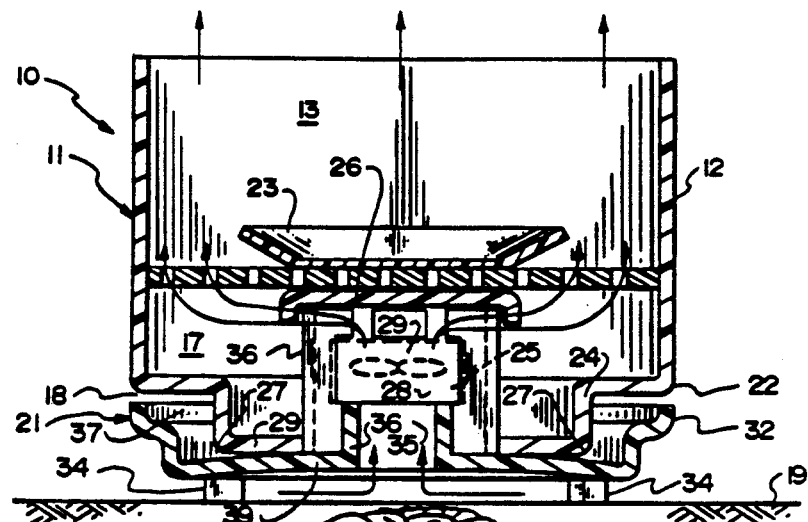

ROOM AIR PURIFICATION

This is a division of application Ser. No. 185,588, filed Apr. 22, 1988 now U.S. Pat. No. 4,975,251 issued Dec. 4, 1990.

FIELD OF THE INVENTION

This invention relates to purification of ambient air, as in a room, vehicle, or other confined space, especially by conversion or extraction of noxious gases or of liquid or solid particulate matter.

BACKGROUND OF THE INVENTION

For many years, green plants have been considered beneficial to their environment, in that they take up carbon dioxide and give off oxygen, and activated carbon has long been known to adsorb onto its extensive surface a wide variety of contaminants in gaseous form.

Combination of such desirable capabilities has been suggested, as by B. C. Wolverton of NASA in Nat'l Space Technology Laboratories papers; a notable example is "Houseplants, Indoor Air Pollutants, and Allergenic Reactions" (MS 39529, dated December 1986). Other persons have reported Wolverton's views and have advanced their own, including Joan Gandy, "Nature's Way" in Garden Club of America's GCA Bulletin, Aug. 15, 1986, pp. 14-18; and (anon.) "Indoor Pollution Solution" in Rodale's Practical Homeowner, September 1986, p. 18. Yet it has remained for the present inventor to modify such teachings so as to achieve practical success in such purification, as below.

SUMMARY OF THE INVENTION

In general, the objects of this invention are accomplished by withdrawing air from ambient room atmosphere into a region having a living green plant with its roots in a potting medium, passing such air preferably upward through such potting medium, past the plant's roots, through charcoal in, around, or overlying the potting soil, and back into the ambient atmosphere past the plant's leaves.

Apparatus for doing so comprises, for example, a cylindrical waterproof housing having an air intake in its base, foraminous means supporting such potting soil and plant therein, an air-pump underlying such foraminous means, with an air inlet open to such air intake and with an air outlet open to such foraminous means. A window-box embodiment is similar except for interior piping.

A primary object of the present invention is to purify room air by a combination of steps that are easy to understand, simple to carry out, but requiring particular interrelation to be effective.

Another object of this invention is to provide compositions especially useful in such particular interrelationship.

A further object of the invention is to provide apparatus for utilizing such compositions in practicing such purification.

Other objects of this invention, together with methods and means for attaining the various objects, will be apparent from the following description and the accompanying diagrams, which are presented by way of example rather than limitation.

SUMMARY OF THE DRAWINGS

FIG. 1 is a sectional elevation of a cylindrical apparatus embodiment of the present invention;

FIG. 2 is a side elevation of the apparatus of FIG. 1 with a plant therein and partly sectioned away to show the interior; and FIG. 3 is a longitudinal elevation of another apparatus embodiment of this invention, having a rectangular plan, with a plurality of plants inside and similarly partly sectioned away.

DETAILED DESCRIPTION

FIG. 1 shows, in diametral cross-section, first embodiment 10 of this invention, featuring cylindrical housing 11 and base 21 on feet 34 spacing bottom 39 of the base above supporting surface 19. The housing is divided into upper and lower regions 13 and 17 by horizontal foraminous plate 15. Cylindrical housing wall 12 is open at its top and extends down for a major part of the vertical extent of the apparatus and then abruptly curves inward about one-fourth of the distance above underlying supporting surface 19, leaving shoulder 22 as its externally visible lower edge. After necking inward to cylindrical portion 24, the housing terminates in narrow horizontal flange 29, whose edge borders a large axial opening (not numbered). The flange is secured to the top surface of bottom 39 of the base, considered further below. Weepholes 27 in flanged neck 23 drain into annular space 37 defined between it and wall 32 of the base. Outside, the top edge of base wall 32 and the shoulder 22 of the housing outer wall define peripheral slot 18.

Base 21 has central bottom opening 35 surrounded by collar 36 to about the level of the housing shoulder. Air-pump 25 is above the collar and within surrounding small rook-shaped housing 31, which has crenelations at its upper edge and is affixed at its bottom edge to the upper surface of base bottom 39. The air-pump is shown schematically with fan blades (motor not shown separately). It has inlet 28 communicating with base opening 35, and outlet 38 communicating with upper chamber 13 through the crenelations of the small housing and the openings in the foraminous plate. Lower water shield 26 extends outward and somewhat downward to overlie the air-pump, whereas upper water shield 23 extends outward and somewhat upward to support the initial root ball of the plant placed in the larger housing. Feet 34 support base 21 with its bottom above the underlying supporting surface sufficiently to allow ambient air to enter via base opening 35. Arrows show pumped airflow directions: in from the exterior to the pump and out therefrom and through the crenelations in the small housing and the foraminous plate openings into the upper chamber and out the top of the upper housing.

FIG. 2 shows in elevation the apparatus of the preceding view with plant 40 therein. Part of housing wall 22 is cut away to reveal roots 46 in potting soil 48, a layer of which extends from the foraminous plate up about halfway to the top of the housing. Carbonaceous layer 41 overlies the potting soil. The same airflow directions prevail as noted in the preceding view, but through the potting soil surrounding the plant roots, then between and over such roots, and through layer 41 of carbonaceous material. Upon exiting housing 11, the air passes over leaves 42 on stem 44 of the plant and back into the ambient atmosphere, as indicated by the arrows. It is apparent from this view that the roots of the plant grow to overflow water shield 23, even to the wall and to but not through the foraminous plate—because no water or nutrients are available in lower chamber 17. Likewise the roots usually fail to penetrate very far (if at all) into the overlying carbonaceous layer.

FIG. 3 shows, in similar manner, modified apparatus embodiment 110 of this invention, in elongated or window-box form and partly broken away in longitudinal extent to conserve space. Numerous components corresponding in function here to those of the previous embodiment are designated by like reference numerals prefixed by 1 (i.e., greater by a hundred) and, being thus readily identifiable, are not necessarily named again—whereas components with different functions here are numbered dissimilarly. Differences other than the obviously unlike shapes include plural or multiple components, designated by unprimed and primed reference numerals, respectively.

Thus, housing 111 has water shield 123 in elongated channel form extending the length of this window-box or like embodiment. Plants 140, 140', 140'' are arranged in a row therein and tend to extend their roots together in the lengthwise direction and to overflow the channel in the lateral direction much as previously. No plan view is included, but it will be apparent that two or more rows of plants could be present, either in a single wide channel or in side-by-side multiple channels resting, preferably removably, on foraminous plate 115. Moreover, if desired, housing 111 could be subdivided into modular end sections and intermediate sections to enable window-boxes or the like to be mixed and matched in diverse lengths—and, if desired, in different designs of external walls.

In operation the embodiments of this invention are capable of removing contaminating gases, liquid and solid particulates, many of them acidic, including acid-coated carbonaceous dust particles. Cigarette smoke, a notable offender, is reduced in concentration promptly and effectively, depending upon the volume of room air to be so circulated and purified. Included among prominent removable materials are noxious aliphatic and aromatic aldehydes and ketones, halogenated hydrocarbons, and cyclic hydrocarbons.

The room air purifiers of this invention may be produced in a wide range of sizes; their relative efficacy increases with size. Such recital of contaminants so removable is exceedingly modest, as more extensive decontamination reports are accumulating with increasing use in diverse environments. Hanging or tabletop models range in diameter up to about a foot, and floor models from about a foot to a couple feet. Window-box and other elongated shapes may be a foot to several feet in width and have no length limitation. These purifiers may extend along an entire wall or an interior site and may be placed in tiered or terraced arrangements, for example.

No special materials of construction are required to produce such room air purifiers. Wood and anodized, plated, or otherwise stable metals are suitable, as are many ceramics. For economy, relatively inert polymeric materials, such as polyhydrocarbons or polyvinyl chloride, are preferred. Containers of whatever organic composition may be coated or covered with the foregoing materials for esthetic and/or practical reasons.

Many small fans, such as the squirrel-cage type, are available that function quite well as air-pumps. A relatively low-speed motor rated for continuous use is a good choice, though in practice it may be switched off a substantial part of the day or week. Under heavy concentrations of contamination, either continuous or quite frequent intermittent use is most beneficial to the room occupants and is not at all harmful to the plant(s). For a given rate of air flow, the duty cycle of the fan may be adjusted over time to bring about and then to maintain whatever turnover of room air has proved effective to purify it adequately. An A.C. fan motor is readily connected to a nearby wall outlet by an extension cord, or a D.C. fan motor can be provided with batteries conveniently inside or outside the housing. Of course, an on/off switch is customary.

Plants of proven efficacy in such purification include many philodendrons and pothos, the peace lily, and the spider plant. Other effective plants will be readily identified as such usage increases and as interested investigators measure the benefits.

A suitable potting medium is a fundamental ingredient, of course. Soil not only should be sterilized before use, but also should be lightened to enhance its air-permeability. Preferred additives include carbon granules and sphagnum moss. Additives of such nature not only enhance permeability, but the moss aids water retention, and the granules of activated carbon or similar material assist in removal of contaminants in the soil layer, as well as in the layer of such granules preferably overlying the soil layer.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. In an ambient air purification method including a living green plant having its roots in a surrounding potting medium in an open-top housing through at least some of which such air is passed, the improvement comprising the steps of supporting the plant roots on impermeable saucer means at a central location in such housing, supporting surrounding potting medium on foraminous platelike means extending laterally from such central saucer means toward the sides of said housing, and forcing air up toward the foregoing saucer supporting means from underneath.

2. Air purification method according to claim 1, including the steps of compartmentalizing such housing into an upper open-top compartment and a lower compartment having an opening therein, and forcing air from the exterior of the housing into the lower compartment and upward therethrough.

3. Air purification method according to claim 2, including the step of providing or more weepholes from the lower compartment for the escape of excess water therefrom to the exterior.

4. Ambient air purification method, comprising the steps of providing waterproof housing means substantially larger in plan length than in plan width containing living green plants with roots surrounded by potting medium, providing substantially horizontal waterproof plant-supporting means within the housing narrower than such width and extending lengthwise, and providing a laterally extending potting-medium-supporting foraminous means, thereby dividing said housing means into an upper compartment and a lower compartment, said foraminous means supporting said waterproof plant supporting mean providing ambient air inlets from the exterior into the lower compartment of the housing means below the foregoing foraminous means, and forcing air into and through such inlets and upward and through the foraminous means and the potting medium supported thereby.

5. Air purification method according to claim 4, including providing a plurality of such air inlets at lengthwise intervals.

6. Room air treatment method utilizing living green plants to remove contaminants therefrom, comprising the steps of circumscribing an air-treating region laterally by wall means and underneath by laterally extending foraminous means, supporting upon the foraminous means a saucer support means for receiving an air-permeable potting medium adapted to receive plant roots therein, confining one or more living green plants and their roots laterally in the air-permeable potting medium, and passing room air through the foraminous means and into and through the potting medium supported thereon.

7. Air-treatment method according to claim 6, wherein the direction of airflow is such that the air is passed first through the foraminous means and then through the potting medium.

8. Air-treatment method according to claim 6, including stratifying the potting medium, including a high-nutrient layer and an adjacent relatively low-nutrient or non-nutrient layer.

9. Air-treatment method according to claim 8, wherein the high-nutrient layer comprises potting soil, and the adjacent layer comprises carbonaceous granules.

10. Method of removing contaminants from room air by moving the air along a path containing, an air-treating region having one or more plants and bounded in part laterally by air-impermeable means and supported in part horizontally by air-permeable means and in part by saucer means thereby adapted to retain in the airflow path air-permeable potting medium containing the plant roots.

11. Air treatment method according to claim 10, including removing particulate contaminants from such air.

12. Air treatment method according to claim 11, wherein particulate contaminants so removed include acid-coated carbonaceous dust.

13. Air treatment method according to claim 10, wherein gaseous contaminants so removed include compositions from the class consisting of aliphatic and aromatic aldehydes and ketones, halogenated hydrocarbons, and cyclic hydrocarbons.

* * * * *